United States Patent
Bailly et al.

(10) Patent No.: US 9,964,194 B2
(45) Date of Patent: May 8, 2018

(54) POWER SPLIT TRANSMISSION

(71) Applicant: ZF Friedrichshafen AG, Friedrichshafen (DE)

(72) Inventors: Gerhard Bailly, Friedrichshafen (DE); Jürgen Pohlenz, Ravensburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days. days.

(21) Appl. No.: 15/498,935

(22) Filed: Apr. 27, 2017

(65) Prior Publication Data

US 2017/0350489 A1  Dec. 7, 2017

(30) Foreign Application Priority Data

Jun. 7, 2016  (DE) .................. 10 2016 209 943

(51) Int. Cl.
*F16H 47/04* (2006.01)
*F16H 3/091* (2006.01)
*F16H 3/08* (2006.01)

(52) U.S. Cl.
CPC ............. *F16H 47/04* (2013.01); *F16H 3/091* (2013.01); *F16H 2003/0803* (2013.01)

(58) Field of Classification Search
CPC ... F16H 47/04; F16H 3/091; F16H 2003/0803
See application file for complete search history.

(56) References Cited

U.S. PATENT DOCUMENTS

| 9,404,564 B1* | 8/2016 | Calvert | F16H 47/04 |
| 2007/0142168 A1* | 6/2007 | DeMarco | B60W 30/194 |
| | | | 477/41 |
| 2012/0065854 A1* | 3/2012 | Stoller | F16H 61/10 |
| | | | 701/60 |
| 2012/0122624 A1* | 5/2012 | Hawkins, Jr. | F16H 37/086 |
| | | | 475/219 |
| 2013/0068545 A1* | 3/2013 | Cronin | B62D 55/06 |
| | | | 180/9.1 |
| 2015/0219194 A1* | 8/2015 | Winter | F16H 37/086 |
| | | | 475/214 |
| 2017/0248213 A1* | 8/2017 | Peters | F16H 37/086 |

FOREIGN PATENT DOCUMENTS

| DE | 10 2010 029 866 A1 | 12/2011 |
| DE | 10 2011 077 090 A1 | 12/2012 |

* cited by examiner

*Primary Examiner* — David J Hlavka
(74) *Attorney, Agent, or Firm* — Davis & Bujold PLLC; Michael J. Bujold

(57) ABSTRACT

A power split transmission which has a first part (2) and a second part (22). The first part (2) includes a variator (10), a summing gearset (6) and a shiftable transmission gear assembly (18). A standard transmission can be used as the multispeed transmission (23).

10 Claims, 6 Drawing Sheets

POWER SPLIT TRANSMISSION

This application claims priority from German patent application serial no. 10 2016 209 943.4 filed Jun. 4, 2016.

FIELD OF THE INVENTION

The invention relates to a power split transmission.

BACKGROUND OF THE INVENTION

Power split transmissions of the type concerned comprise a continuous rotational speed variator, a summing gearset and a multispeed transmission, by means of which a plurality of gear ratios can be engaged. Such power split transmissions of the type concerned are often used in smaller working machines and agricultural machines, also known as tractors.

DE 10 2010 029 866 A1 discloses a power split transmission having a variator, a summing gearset and a multispeed transmission.

SUMMARY OF THE INVENTION

The purpose of the present invention is to develop further such a power split transmission with a continuous rotational speed variator, a summing gearset and a multispeed transmission.

This objective is achieved with a power split transmission of the type concerned which also embodies the characterizing features specified in the principal claim.

According to the invention, the power split transmission comprises a first part and a second part. The first part comprises a continuous rotational speed variator and a summing gearset. The continuous rotational speed variator consists of a first unit and a second unit, wherein the first and second units can be in the form of hydraulic units such as axial piston units or electrical units. When hydraulic units such as axial piston units are used, it is preferable to use one unit with a continuously adjustable stroke volume and a constant unit, whereby a defined transmission ratio spread is produced. It is also possible, however, to design both hydraulic units as continuously adjustable units or to design the hydraulic units as radial piston units. The summing gearset is preferably in the form of a planetary gearset, this planetary gearset preferably being a simple planetary stage with a sun gear, planetary gearwheels and a ring gear. Thus, the summing gearset is in the form of a three-shaft planetary gear assembly. Preferably, the first part of the power split transmission is a gear system with a coupling on the input side, also known as primary coupling, for connecting the variator to the summing gearset. In this context 'primary coupling' means that the first unit of the variator is in direct functional connection with the input shaft of the first part and thereby a drive engine, which drives the input shaft, permanently drives the first unit of the variator. The first unit is functionally connected to the second unit and the second unit is then functionally connected directly or indirectly to the summing gearset. At the same time, the summing gearset is connected either directly or indirectly to the input shaft of the first part, whereby depending on the rotational speed of the second unit, the third shaft of the summing gearset—namely the output shaft of the summing gearset—either rotates or is at rest. According to the invention, either between the second unit of the variator and the summing gearset there is a shiftable transmission gear assembly by means of which two different gear ratios can be engaged, or alternatively, the shiftable transmission gear assembly is between the input shaft of the first part and the summing gearset. By virtue of this shiftable transmission gear assembly, when the first gear ratio of the transmission gear assembly is engaged, it is possible to adjust the variator in such manner that when the input shaft of the first part is rotating, the third shaft of the summing gearset, i.e. its output shaft, is at rest. This condition is also known as 'powered zero'. By shifting the transmission gear assembly to its second gear ratio the spread is increased considerably, whereby the vehicle can reach the required final speed. When the second gear ratio is engaged and the input shaft of the first part is rotating, the third shaft of the summing gearset always rotates regardless of how the variator is adjusted. Thus, when the second gear ratio of the shiftable transmission gear assembly is engaged, the powered zero condition is not possible. For engaging the two different gear ratios the shiftable transmission gear assembly comprises friction clutches by means of which the gearshift can be carried out. If the shiftable step-down gear assembly is arranged between the second unit of the variator and the summing gearset, this makes it possible to carry out shifts in the shiftable transmission gear assembly when the second unit is at rest. This provides the possibility that the clutches of the shiftable transmission gear assembly are also at rest and therefore have the same rotational speed. However, it is also possible to carry out the shifts while the second unit is rotating, whereby the clutches have a rotational speed difference so that during the shifting process of the shiftable clutches in the shiftable transmission gear assembly the variator gear ratio is adapted or changed. This rotational speed change as described, for example, in DE 10 2011 077 090 A1, should therefore be involved in the shifting process.

If the shiftable transmission gear assembly is positioned between the input shaft of the first part and the summing gearset, the clutches of the shiftable transmission gear assembly will always have a rotational speed difference which always entails a change of the variator gear ratio during the shifting process.

Preferably, the shiftable transmission gear assembly is controlled by means of an electronic vehicle control system in such manner that when starting off from when the vehicle is at rest, or decelerating down to rest, the gear ratio engaged in the shiftable transmission gear assembly is that in which the variator unit can be adjusted so that the third shaft or output shaft of the summing gearset is at rest even though the input shaft of the first part is rotating. If while being driven the vehicle reaches a previously defined speed, the possibility exists of engaging the second gear ratio of the shiftable transmission gear assembly. This changes the spread of the continuous part in such manner that it is no longer possible for the third shaft or output shaft of the summing gearset to come to rest, even if the variator adjustment range is used to its maximum extent.

The second part of the power split transmission comprises the multispeed transmission, which has a number of set gear ratios adapted to suit the demands made on the vehicle with regard to the traction force and driving speed. In combination with the variable rotational speed of the continuous part, i.e. the variator, and in combination with the summing gearset, these shiftable gear ratios determine the available driving ranges. The gear ratios of the respective ratio steps in the multispeed transmission are matched to the continuous part, i.e. the first part of the transmission, in such manner that when the full variator adjustment range in the continuous part is used the drive output rotational speed band of the respective adjacent driving ranges can be reached or, if necessary, slightly overlapped. For each driving range the multispeed transmission has an associated clutch which makes it possible, when changing the driving range, to carry out overlapping shifts to the clutch for the new driving range and thereby to adapt the rotational speed of the variator. The adaptation of the rotational speed of the variator again takes place in accordance with DE 20 1110 077 090 A1.

It is also possible to choose the gear ratios of the multispeed transmission in such manner that even when the variator adjustment range is used to the full, the drive output rotational speed range of the respective adjacent driving range is intentionally not reached. Comparably to powershift transmissions, to carry out the shift from one driving range to the next it is then additionally necessary to adapt the rotational speed of the internal combustion engine and if needs be, also the torque of the internal combustion engine. In this way a larger spread of the transmission ratios can be achieved.

The first part and the multispeed transmission are designed such that the rotational direction of the drive torque on the input shaft of the second part, i.e. the multispeed transmission, is the same during every driving range change, i.e. the torque load on the variator remains the same in each such driving range shift. A reversal of the torque loading on the variator with a constant load on the drive output only takes place when changing from traction operation to thrust operation of the vehicle, and not as the result of a driving range change.

Since the first part of the power split transmission has an output shaft whose rotational direction does not change, it is possible to design the power split transmission in a modular manner in which a standard multispeed transmission is used. Thus, the criteria for the standard multispeed transmission are independent of the criteria for a continuous power split transmission. The multispeed transmission can be of any design, for example with a countershaft or a planetary configuration. In addition, thanks to the functional separation between the continuous part and the multispeed part, a further multi-gear transmission can be connected upstream from the multispeed transmission for example one configured as a powershift section. In this way, with a suitable design of the individual components a multispeed transmission can be produced whose shifts can be automated and if necessary also designed to be fully power shiftable. This provides the possibility of considering a modular system of continuous transmissions and powershift transmissions, and using the appropriate individual components of the modular system in accordance with the configuration and compatibilities required.

BRIEF DESCRIPTION OF THE DRAWINGS

Further characteristics emerge from the description of the figures, which show.

DETAILED DESCRIPTION OF THE PREFERRED EMBODIMENTS

Figure 1:
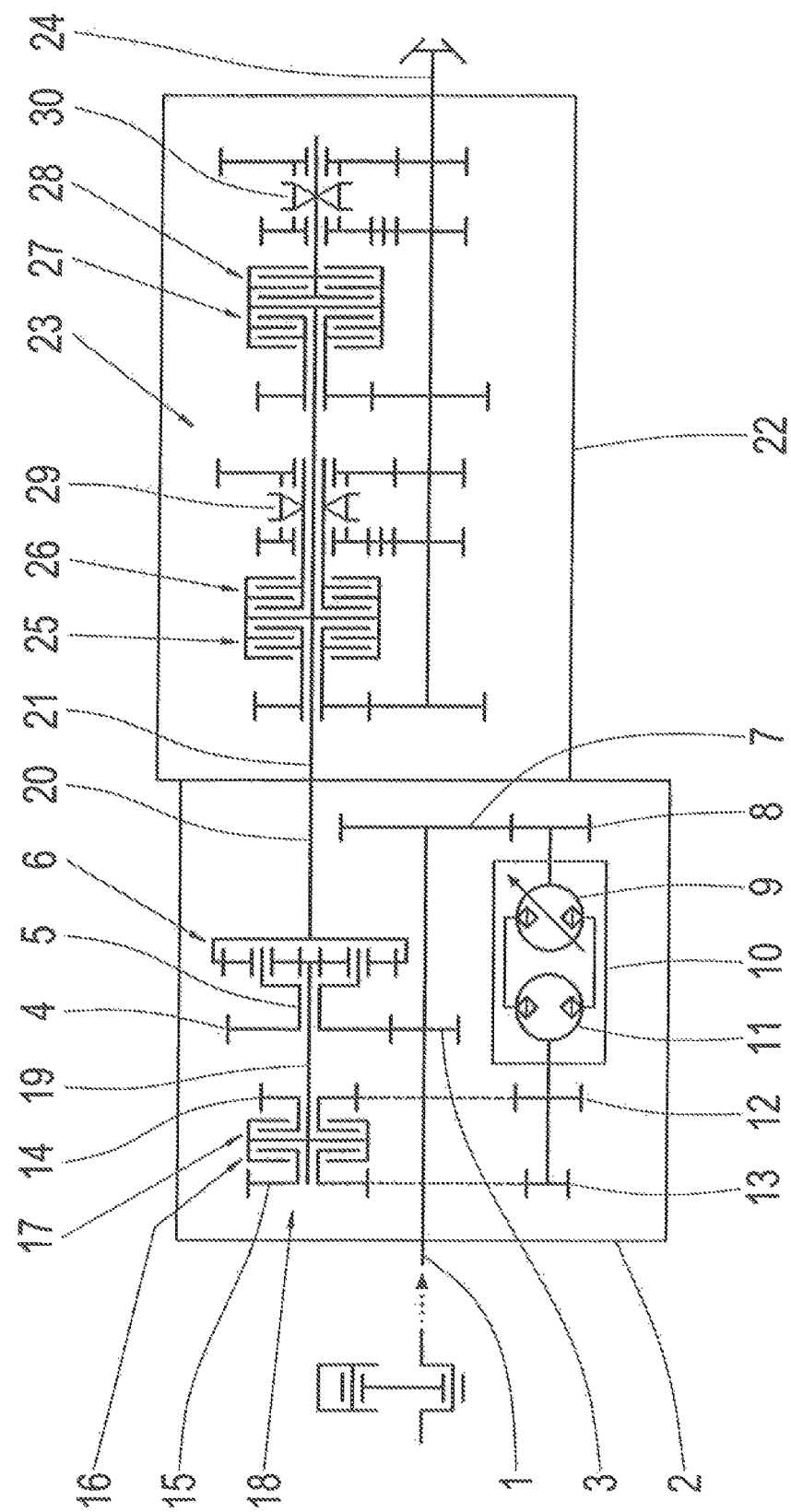
FIG. 1: A power split transmission with a first part and a second part.

FIG. 1:

A drive motor, for example an internal combustion engine, drives the input shaft 1 of the first part 2 of the power split transmission. By way of a spur gear 3 and a spur gear 4, the (engine) input shaft 1 drives the shaft 5 of the summing gearset 6. Furthermore, by way of a spur gear 7 and a spur gear 8 the input shaft 1 drives the first unit 9 of the rotational speed variator 10. The second unit 11, which is functionally connected to the first unit 9, drives spur gears 12 and 13. The second unit 11 is preferably in the form of a hydraulic constant unit, for example a constant axial piston machine, and the first unit 9 is in the form of a hydraulic unit whose stroke volume can be adjusted. However, it is also possible for the first and second units 9 and 11 to be electrical units. The spur gear 12 is functionally connected to the spur gear 14 and the spur gear 13 is functionally connected to the spur gear 15. Together with the clutches 16 and 17 the spur gears 14 and 15 form the shiftable transmission gear assembly 18. Depending on whether the clutch 16 or 17 is closed, the shaft 19 of the summing gearset 6 is connected to the second unit 11 with a larger or smaller gear ratio. The shaft 20 is connected to the (transmission) input shaft 21 of the second part 22 or made integrally therewith. In this way the rotational speed and the torque of the output of the summing gearset 6 are transmitted by way of the shaft 20 to the second part 22. Thus, depending on requirements, a standard multispeed transmission 23 can be used as the second part 22. The multispeed transmission 23 shown in FIG. 1 is in the form of a countershaft multispeed transmission wherein the drive output shaft 24, which for example can drive an axle-drive bevel gear of the rear axle of a tractor, is connected to the input shaft 21 by way of various shiftable gear ratios by means of the clutches 25, 26, 27, 28 and the shifting elements 29 and 30. By means of the shifting elements 29 and 30 the rotational direction of the drive output shaft 24 can be changed so that the vehicle can be driven forward or in reverse. The various gear ratios are engaged by means of the clutches 25, 26, 27 and 28.

FIG. 2:

The second part 22 corresponds to the second part 22 in FIG. 1. The first part 2 contains the shiftable transmission gear assembly 18 on the input shaft 1, and depending on the shifting position of the clutches 16 and 17, the input shaft 1 is connected to the shaft 5 of the summing gearset 6. The second unit 11 is connected to the shaft 19 by way of the spur gears 13 and 15.

Figure 3:
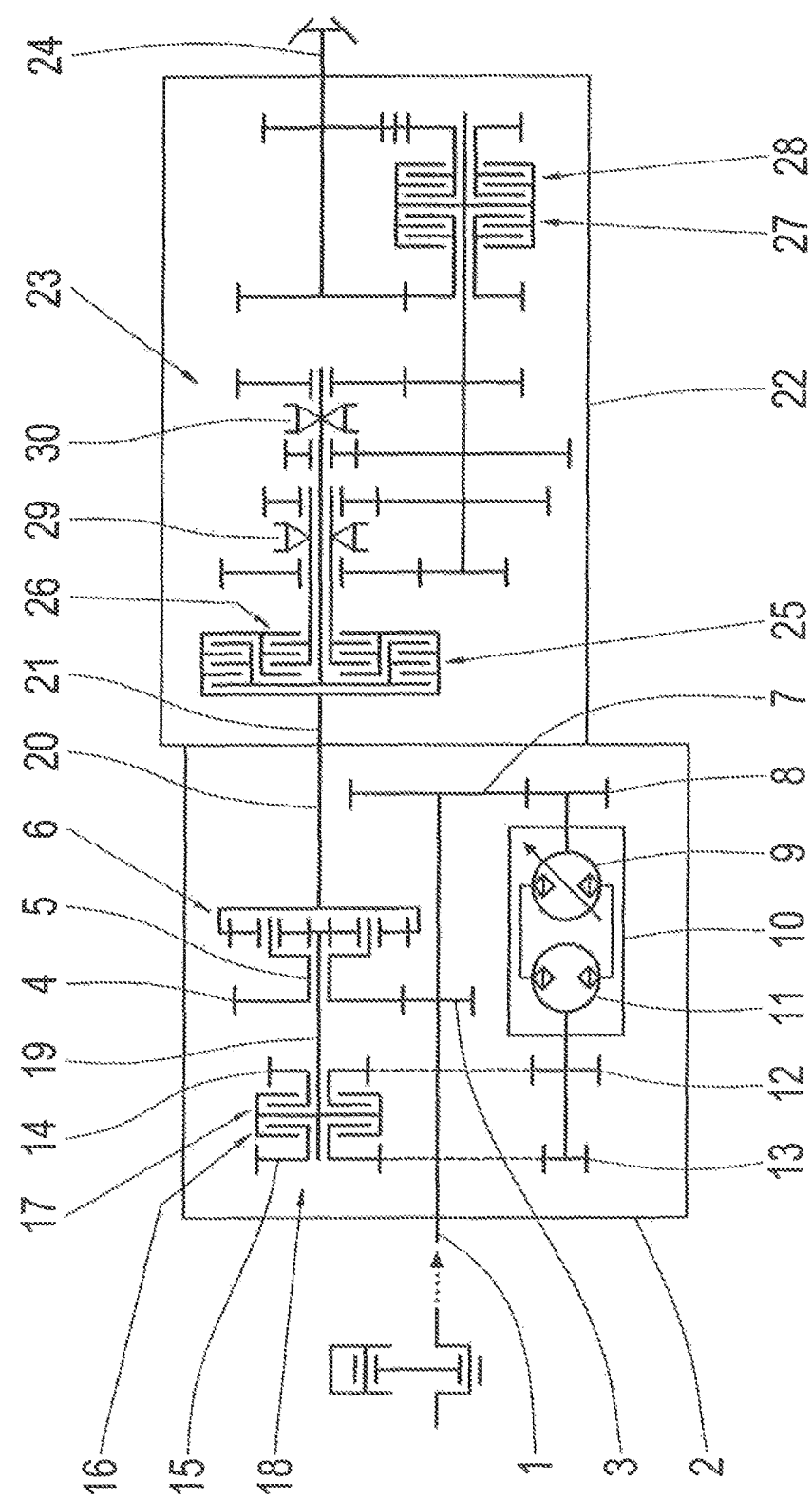
FIG. 3: A power split transmission with a first part and a second part.

FIG. 3:

The first part 2 in FIG. 3 corresponds to the first part 2 in FIG. 1. The second part 22 comprises the clutches 27 and 28 by means of which the rotational direction of the drive output shaft 24 is changed, whereby a forward driving direction and a reverse driving direction are enabled, and also the clutches 25 and 26 and shifting elements 29 and 30 by the shifting of which the various gears can be engaged. The clutches 25 and 26 are in this case powershift clutches.

Figure 2:
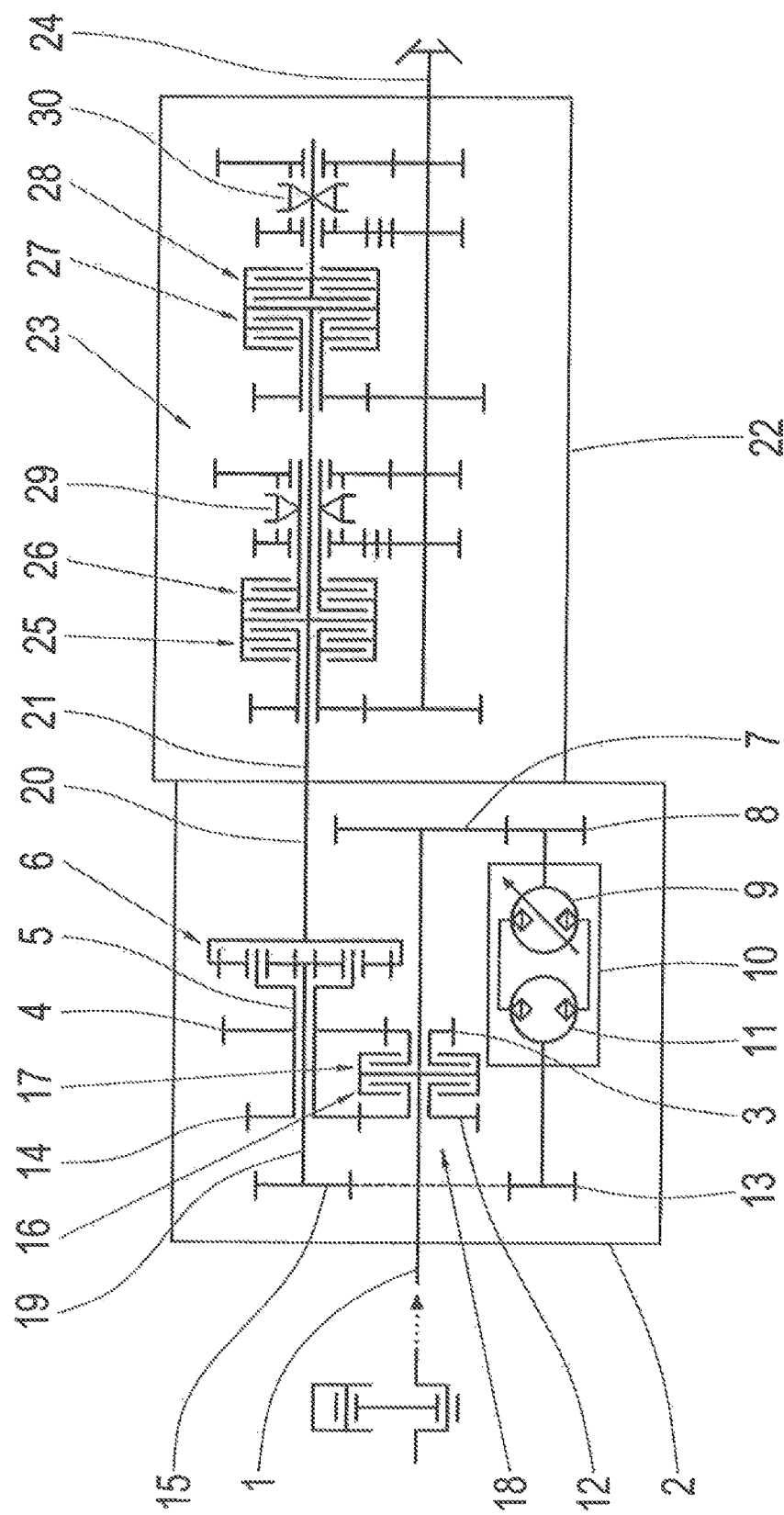
FIG. 2: A power split transmission with a first part and a second part.
Figure 4:
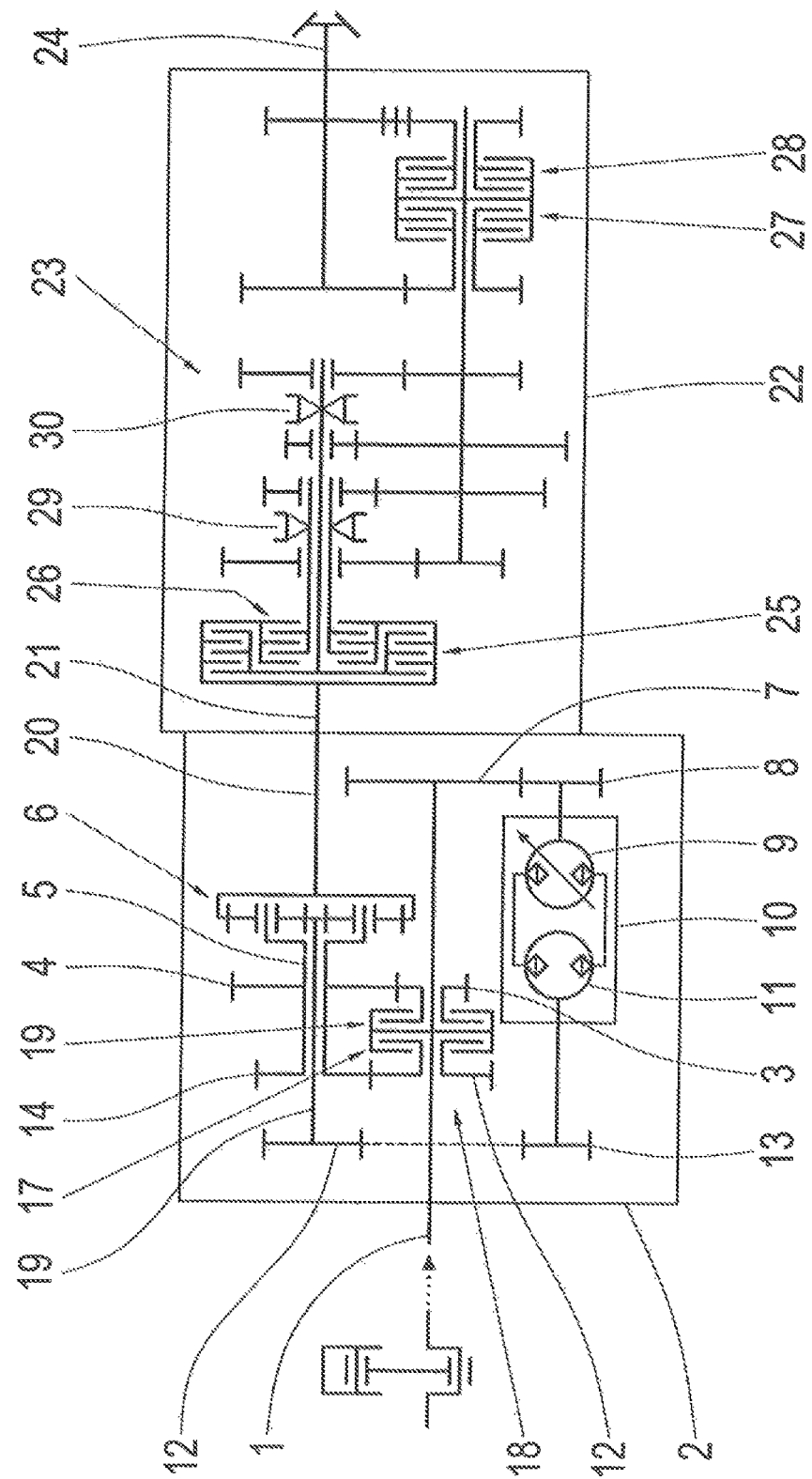
FIG. 4: A power split transmission with a first part and a second part.

FIG. 4:

The first part 2 in FIG. 4 corresponds to the first part 2 in FIG. 2. The second part 22 in FIG. 4 corresponds to the second part 22 in FIG. 3.

Figure 5:
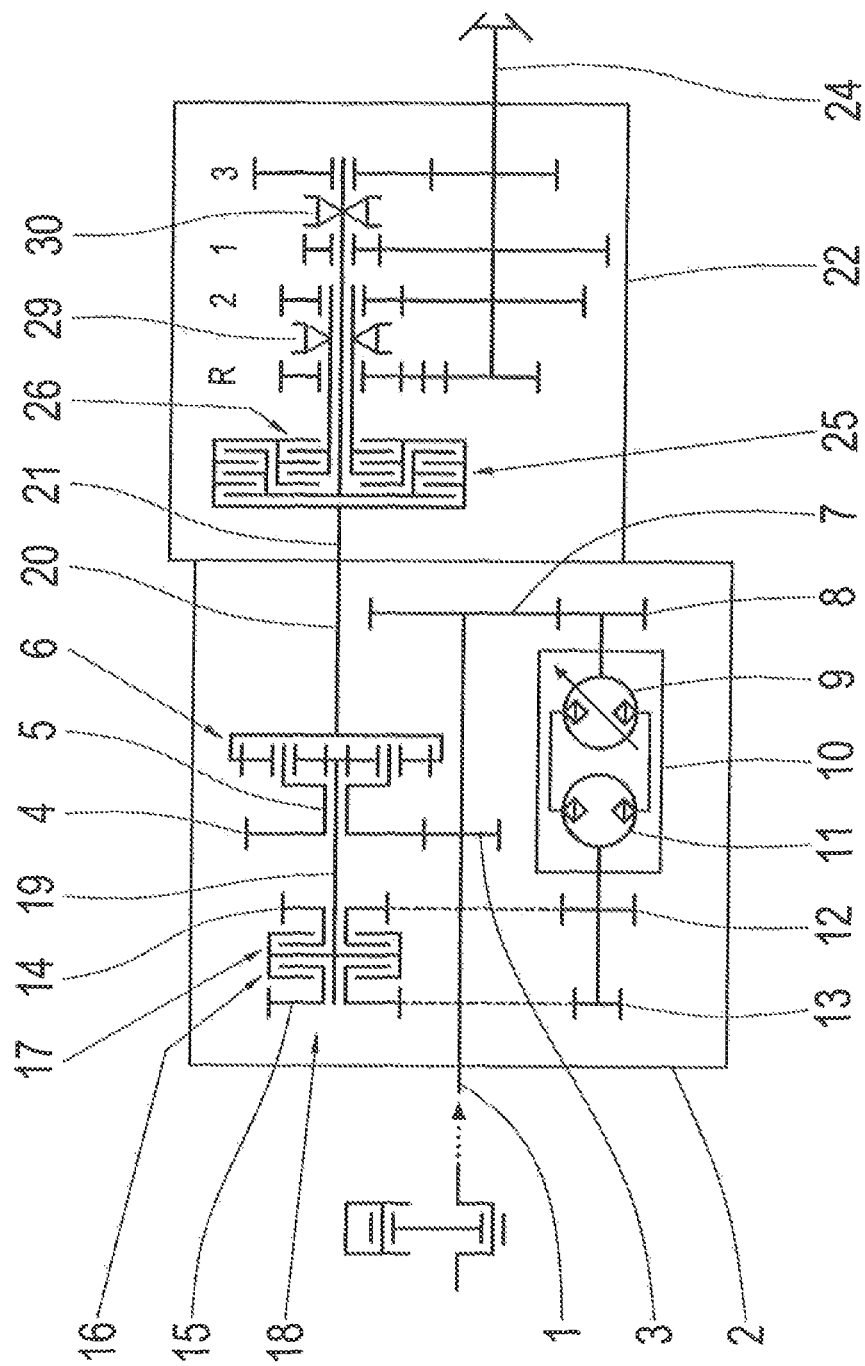
FIG. 5: A power split transmission with a first part and a second part.

FIG. 5:

The first part 2 in FIG. 5 corresponds to the first part 2 in FIG. 1. The second part 22 has the shifting element 29 by means of which the rotational direction of the drive output shaft 24 is changed, so enabling a shift from forward to reverse driving. By means of the clutches 25 and 26 and the shifting elements 29 and 30, the various gears can be engaged.

Figure 6:
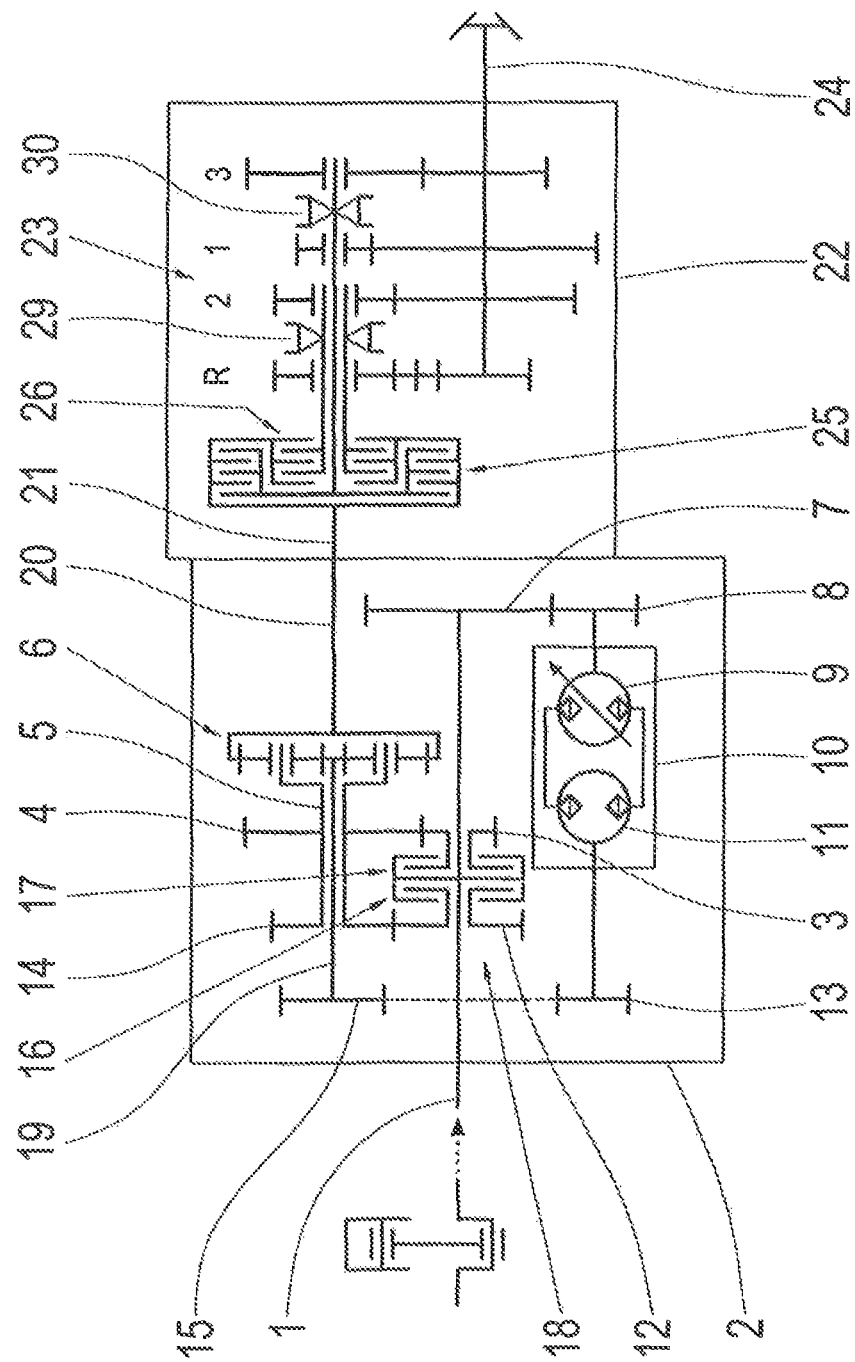
FIG. 6: A power split transmission with a first part and a second part.

FIG. 6:

The first part 2 in FIG. 6 corresponds to the first part 2 in FIG. 2. The second part 22 in FIG. 6 corresponds to the second part 22 in FIG. 5.

INDEXES

1 Input shaft
2 First part
3 Spur gear
4 Spur gear
5 Shaft
6 Summing gearset
7 Spur gear
8 Spur gear
9 First unit
10 Rotational speed variator
11 Second unit
12 Spur gear
13 Spur gear
14 Spur gear
15 Spur gear
16 Clutch
17 Clutch
18 Shiftable transmission gear assembly
19 Shaft
20 Shaft
21 Input shaft
22 Second part
23 Multispeed transmission
24 Drive output shaft
25 Clutch
26 Clutch
27 Clutch
28 Clutch
29 Shifting element
30 Shifting element

The invention claimed is:

1. A power split transmission comprising:
a first part (2),
a second part (22),
the first part (2) comprising a continuous rotational speed variator (10) having a first unit (9) and a second unit (11),
a summing gearset (6) in a form of a planetary transmission,
the second part (22) comprising a multispeed transmission (23) by which a plurality of gear ratios are engagable such that, in the first part (2), an engine input shaft (1), that is connectable to a drive motor, being functionally connectable to both the first unit (9) and to a first shaft (5) of the summing gearset (6), and the second unit (11) being functionally connectable with a second shaft (19) of the summing gearset (6),
the multispeed transmission (23) having a transmission input shaft (21) which is either functionally connected to a third shaft (20) of the summing gearset (6) or is made integrally with the third shaft (20) of the summing gearset (6), and
a shiftable transmission gear assembly (18), in which a first gear ratio and a second gear ratio are engagable, forming a functional connection either between the second unit (11) and the second shaft (19) of the summing gearset (6) or between the engine input shaft (1) of the first part (2) and the first shaft (5) of the summing gearset (6),
wherein a rotational direction of the transmission input shaft (21) of the multispeed transmission (23) is not changed by a gear ratio change of the variator (10).

2. The power split transmission according to claim 1, wherein the variator (10) is either a hydraulic variator or an electrical variator.

3. The power split transmission according to claim 1, wherein the first gear ratio is designed such that when the engine input shaft (1) of the first part (2), which is connectable to the drive motor, is rotating, the variator (10) is adjustable in such manner that the transmission input shaft (21) of the multispeed transmission (23) is not rotating, and the second gear ratio is designed such that when the engine input shaft (1) of the first part (2), which is connectable to the drive motor, is rotating, the transmission input shaft (21) of the multispeed transmission (23) cannot be brought to rest.

4. The power split transmission according to claim 3, wherein the first gear ratio is automatically engaged below a predefined rotational speed of a drive output shaft (24) of the multispeed transmission (23).

5. A power split transmission comprising:
a first part (2);
a second part (22);
the first part (2) comprising a continuous rotational speed variator (10) having a first unit (9) and a second unit (11);
a summing gearset (6) in a form of a planetary transmission;
the second part (22) comprising a multispeed transmission (23) by which a plurality of gear ratios are engagable such that, in the first part (2), an engine input shaft (1), that is connectable to a drive motor, being functionally connectable to both the first unit (9) and to a first shaft (5) of the summing gearset (6), and the second unit (11) being functionally connectable with a second shaft (19) of the summing gearset (6);
the multispeed transmission (23) having a transmission input shaft (21) which is either functionally connected to a third shaft (20) of the summing gearset (6) or is made integrally with the third shaft (20) of the summing gearset (6); and
a shiftable transmission gear assembly (18), in which a first gear ratio and a second gear ratio are engagable, forming a functional connection either between the second unit (11) and the second shaft (19) of the summing gearset (6) or between the engine input shaft (1) of the first part (2) and the first shaft (5) of the summing gearset (6);
wherein while the second unit (11) is at rest, the transmission gear assembly (18) is shifted.

6. A power split transmission comprising:
first part (2);
second part (22);
the first part (2) comprising a continuous rotational speed variator (10) having a first unit (9) and a second unit (11);
a summing gearset (6) in a form of a planetary transmission;

the second part (22) comprising a multispeed transmission (23) by which a plurality of gear ratios are engagable such that, in the first part (2), an engine input shaft (1), that is connectable to a drive motor, being functionally connectable to both the first unit (9) and to a first shaft (5) of the summing gearset (6), and the second unit (11) being functionally connectable with a second shaft (19) of the summing gearset (6);

the multispeed transmission (23) having a transmission input shaft (21) which is either functionally connected to a third shaft (20) of the summing gearset (6) or is made integrally with the third shaft (20) of the summing gearset (6); and a shiftable transmission gear assembly (18), in which a first gear ratio and a second gear ratio are engagable, forming a functional connection either between the second unit (11) and the second shaft (19) of the summing gearset (6) or between the engine input shaft (1) of the first part (2) and the first shaft (5) of the summing gearset (6);

wherein while the second unit (11) is rotating, the transmission gear assembly (18) is shifted and, during the shift, a gear ratio in the variator (10) is changed.

7. The power split transmission according to claim 1, wherein the multispeed transmission (23) has at least two shiftable gear ratios, in a first rotational direction, and at least one shiftable gear ratio, in a second rotational direction.

8. The power split transmission according to claim 7, wherein gear ratios of respective ratio steps of the multispeed transmission (23) are coordinated with the variator (10) in such a manner that when a full variator adjustment range is used, a drive output rotational speed of respective adjacent driving ranges of the multispeed transmission (23) is reached or slightly overlapped.

9. The power split transmission according to claim 8, wherein when the multispeed transmission (23) is shifted, a gear ratio of the variator (10) is adapted.

10. The power split transmission according to claim 7, wherein gear ratios of respective ratio steps of the multispeed transmission (23) are not reached and not overlapped, and a rotational speed and a torque of the drive motor are adapted.

* * * * *